United States Patent [19]

Spurrier

[11] 3,994,775
[45] Nov. 30, 1976

[54] CONTROL ROD SYSTEM USEABLE FOR FUEL HANDLING IN A GAS-COOLED NUCLEAR REACTOR

[75] Inventor: Francis R. Spurrier, Whitehall, Pa.

[73] Assignee: The United States of America as represented by the United States Energy Research and Development Administration, Washington, D.C.

[22] Filed: Feb. 25, 1976
(Under Rule 47)

[21] Appl. No.: 661,207

[52] U.S. Cl. ............................. 176/36 R; 176/30; 176/86 R
[51] Int. Cl.² .................................... G21C 7/08
[58] Field of Search ............... 176/30, 31, 32, 35, 176/36, 84, 86 R

[56] References Cited
UNITED STATES PATENTS

| | | |
|---|---|---|
| 3,212,980 | 10/1965 | Kmonk et al. ............... 176/36 C |
| 3,377,252 | 4/1968 | Knights ........................ 176/86 R |
| 3,383,286 | 4/1968 | Paget ............................. 176/30 |
| 3,440,139 | 4/1969 | Lapierre ........................ 176/30 |
| 3,607,643 | 9/1971 | Paget ............................ 176/84 |
| 3,691,011 | 9/1972 | Kruger et al. ................. 176/30 |
| 3,936,089 | 2/1976 | Hoffmeister ................... 176/30 |

Primary Examiner—Stephen C. Bentley
Assistant Examiner—S. A. Cangialosi
Attorney, Agent, or Firm—Dean E. Carlson; Arthur A. Churm; Joseph N. Hosteny

[57] ABSTRACT

A control rod and its associated drive are used to elevate a complete stack of fuel blocks to a position above the core of a gas-cooled nuclear reactor. A fuel-handling machine grasps the control rod and the drive is unlatched from the rod. The stack and rod are transferred out of the reactor, or to a new location in the reactor, by the fuel-handling machine.

5 Claims, 5 Drawing Figures

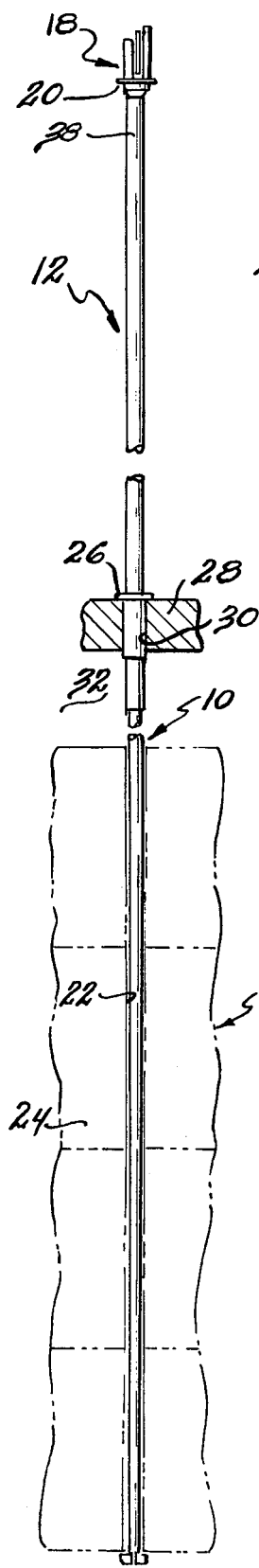
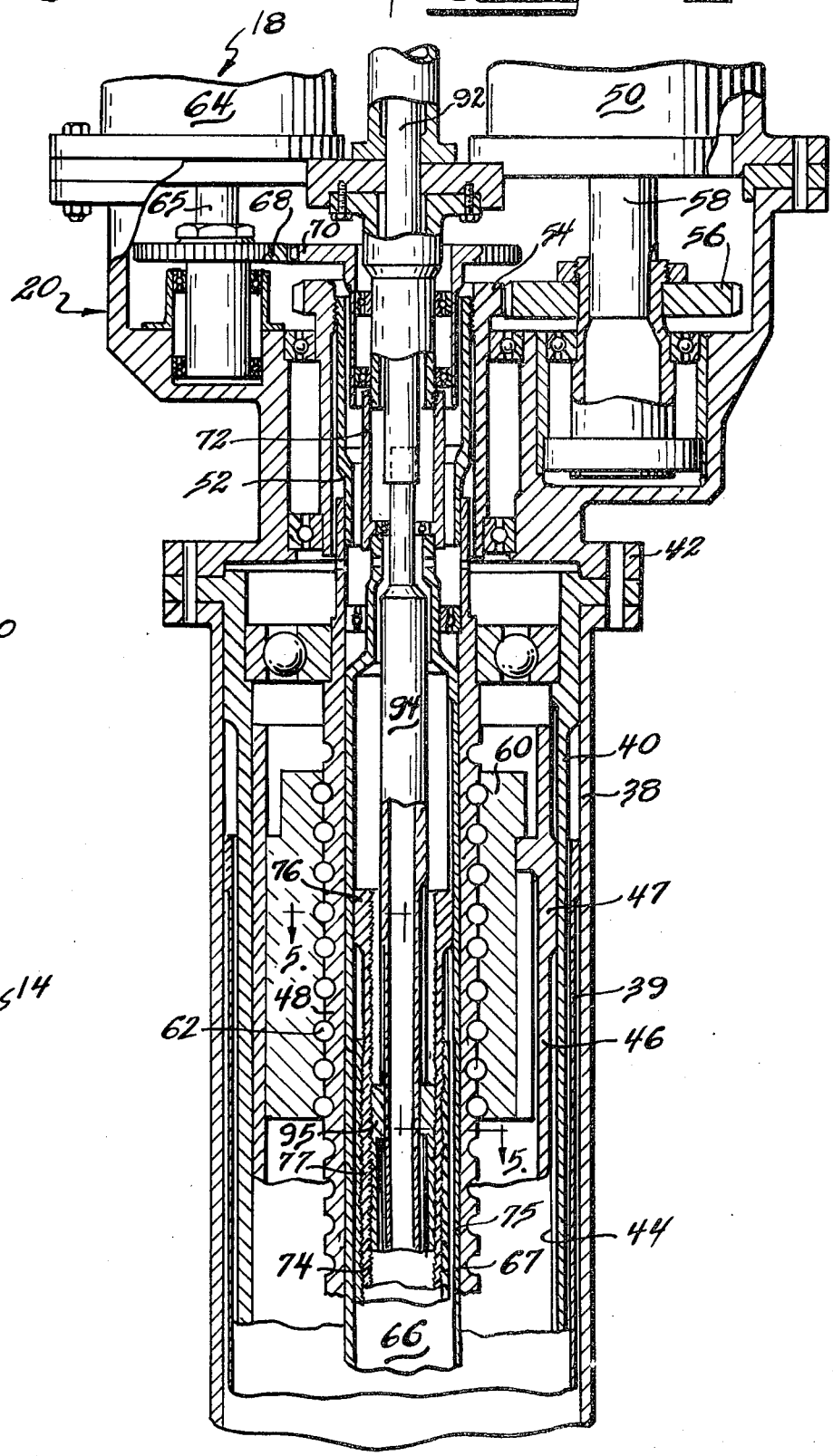

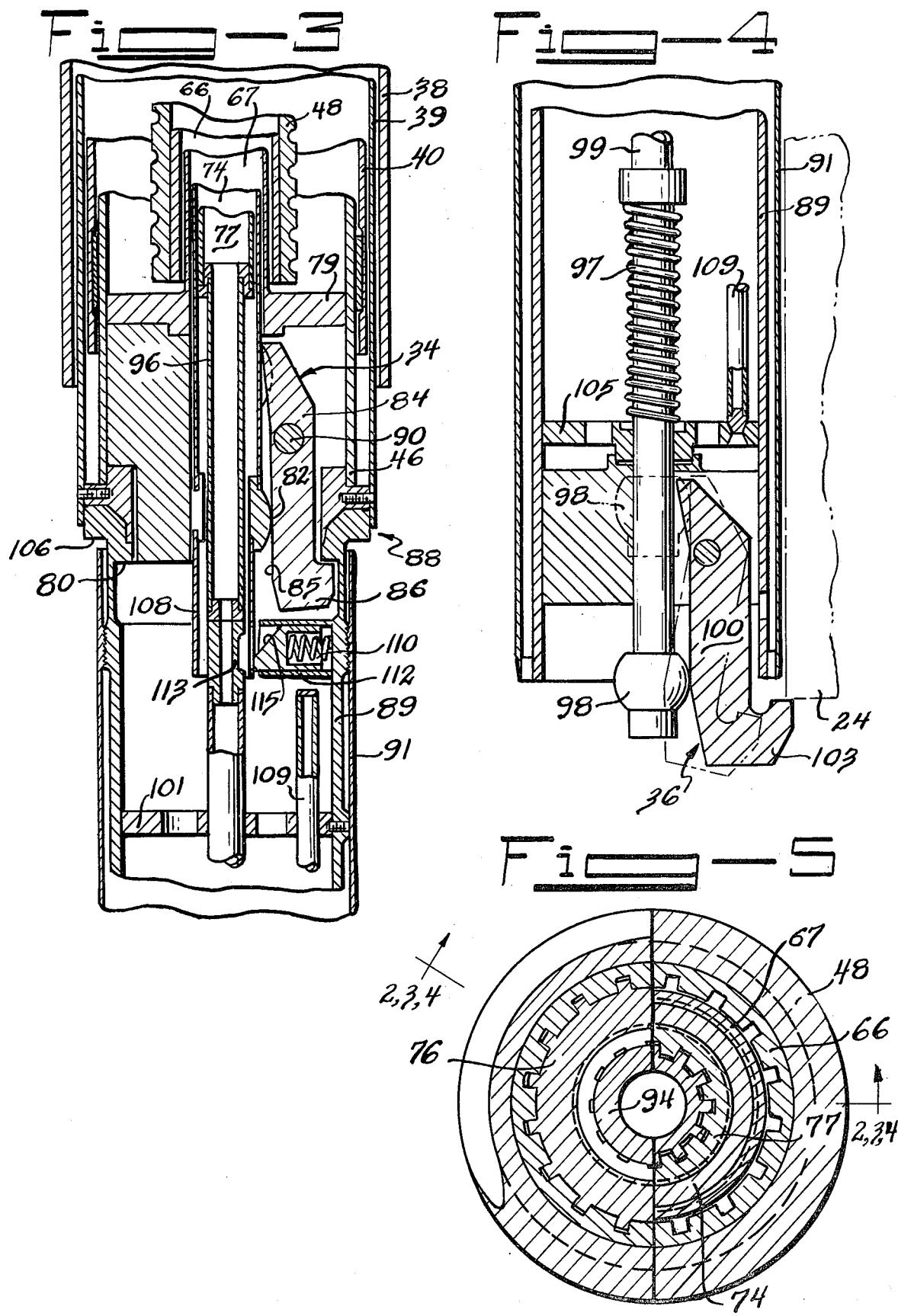

3,994,775

CONTROL ROD SYSTEM USEABLE FOR FUEL HANDLING IN A GAS-COOLED NUCLEAR REACTOR

CONTRACTUAL ORIGIN OF THE INVENTION

The invention described herein was made in the course of, or under, a contract with the UNITED STATES ENERGY RESEARCH AND DEVELOPMENT ADMINSTRATION.

BACKGROUND OF THE INVENTION

The invention is directed to a control rod and associated drive which can be employed in fuel handling in a gas-cooled nuclear reactor.

Nuclear reactors used in electrical generating stations, as process heat sources, etc., require periodic refueling. Refueling must in many cases be accomplished while the reactor is shut down which means that the reactor is not producing useful power during the time required to add to, remove from, or shuffle nuclear fuel in the reactor core. Due to the large capital investment in this equipment, it is important that the reactor be in operation as much of the time as possible to make its operation commercially feasible. Therefore, shutdowns must be minimized in frequency and duration. Refueling shutdowns may be several weeks to several months in duration and may occur as frequently as once every twelve to fifteen months. Furthermore, some maintenance shutdowns may require removal of some or all of the fuel from the core, e.g., to examine pressure vessel welds.

Because fuel addition, removal, and shuffling activities are usually on the critical path for the shutdown, any improvement in the speed with which these tasks may be accomplished results directly in a shortening of the shutdown and hence improves the ability of the reactor to earn revenue.

The refueling of modern gas-cooled reactors involves the removal of a large weight and volume of spent fuel and moderator and its replacement by new fuel. If the reactor must be refueled while shut down, the time available for refueling is necessarily limited by the aforementioned considerations. Refueling while operating, on the other hand, while making available the whole of the plant operating time for refueling, raises serious safety questions and requires a generally higher level of complexity in the fuel-handling equipment. Current gas-cooled reactors designed for shutdown refueling circumvent the problem by refueling a relatively small portion of the core at each annual shutdown period. However, the procedure requires that radial zones of the core be differentially orificed to match the particular fuel burnup situation of the zones. Orificng is an undesirable additional complication and introduces additional core pressure drop which results in the expenditure of increased energy to circulate the primary coolant gas.

Ideally the new fuel should be added at a prescribed axial location across the whole area of the core and the remaining fuel reshuffled axially to make room for the new fuel. However, such a refueling arrangement requires large fuel-handling capability, beyond the capability of current gas-cooled reactors whose fuel is generally added and removed a block at a time through a control rod drive penetration. The system herein removes these limitations on handling capacity by making use of the control rods and their drives in the handling of the fuel. This technique permits the handling of a complete stack of large fuel blocks which greatly reduces the fuel-handling time. The end result is that the entire core of a reactor may be changed or reshuffled in the time required for a normal annular shutdown instead of just a fraction of the core. This, in turn, makes the elimination of differential orificing of radial segments of the core feasible and allows fueling of the reactor core with fuel blocks constant in their composition rather than varying depending upon their position in the core.

SUMMARY OF THE INVENTION

The invention is a system comprising a control rod and drive having a stack latch which may be engaged to lift the stack of fuel blocks in which the rod is normally inserted by its drive, and a rod latch to disconnect the control rod from its drive when the stack is above the core and the fuel-handling machine has assumed the weight of the stack and rod. The rod latch also serves to scram the rod.

It is an object of the invention to enable handling of an entire stack of fuel blocks simultaneously to reduce the time required for fuel handling.

It is another object of the invention to provide a latch mechanism which may be released to scram the control rod upon actuation.

BRIEF DESCRIPTION OF THE DRAWINGS

FIG. 1 is an elevation view of a control rod system useable for fuel handling in a nuclear reactor.

FIG. 2 is a partial section taken along line 2—2 of FIG. 5 showing the gear case, motors, and manually operated shaft.

FIG. 3 is a partial section taken along line 3—3 of FIG. 5 showing the rod latch mechanism.

FIG. 4 is a partial section taken along line 4—4 of FIG. 5 showing the stack latch mechanism.

FIG. 5 is a partial cross section taken along line 5—5 of FIG. 2. This figure is three times the scale of the other figures.

SPECIFIC EMBODIMENT OF THE INVENTION

FIG. 1 shows a control rod 10 and its associated control rod drive 12. The control rod may be withdrawn from the reactor core 14 by the drive 12 which is a telescoping device. The control rod drive has motors 18 and a gear case 20 at one end of the drive 12, shown in greater detail in FIG. 2. Each control rod 10 slides within a hole 22 in the center of a stack 24 of fuel blocks to control the excess reactivity of the core 14.

The control rod system, comprising rod 10 and drive 12, is supported by a flange 26 bolted to the cover 28 of the reactor pressure vessel enclosing the core 14. The drive 12 passes through a penetration 30 in the cover 28 and terminates inside the reactor in the plenum 32 above the core 14. The distance between the pressure vessel cover 28 and the fuel 14 is at least as great as the height of a stack 24 plus the distance by which the drive 12 extends beyond the pressure vessel cover 28 into the plenum 32.

FIG. 2 displays a gear case 20 which provides transmission paths from two motors and one threaded shaft which are partially shown. A drive motor 50 drives the control rod 10 into and out of the core 14; a rod latch motor 64 operates a rod latch mechanism 34 shown in detail in FIG. 3 and the manually operated shaft 92 operates a stack latch mechanism 36 shown in detail in FIG. 4.

Drive outer tube 38 and drive inner tube 40 are fixed to a flange 42 on the gear case 20 and are therefore stationary. Inner tube 40 has splined engagement with a sliding tube 46 by internal splines 44 which engage a splined segment 47 at one end of the sliding tube 46.

Rod latch 34, shown in FIG. 3, is attached to the other end of sliding tube 46. Drive fairing tube 39 provides a smooth cover for sliding tube 46, which is the principal structural member of the moving portion of the drive 12. Sliding tube 46 telescopes into and out of inner tube 40. Drive fairing tube 39 telescopes into and out of the annular space between inner and outer tubes 40 and 38.

Returning to FIG. 2, a ball-threaded drive tube 48 is geared to the drive motor 50 through first tube segment 52, meshing spur gears 54 and 56 and drive motor shaft 58. First tube segment 52 is fixed both to spur gear 54 and drive tube 48. Spur gear 56 is fixed to the drive motor shaft 58. A conventional ball-screw nut 60 is fixed to sliding tube 56 and has ball-threaded engagement with drive tube 48 by means of thread-balls 62. Upon rotation of drive tube 48 by drive motor 50, a force is exerted on ball-screw nut 60 through thread-balls 62. Because the sliding tube 46 is splined to inner tube 40 which is unable to rotate, a sliding motion is thereby imparted to ball-screw nut 60 and sliding tube 46. The sliding motion of tube 46 is transmitted to the control rod 10 through rod latch 34, and the rod is inserted into or withdrawn from the core 14. The splines 44 and splined segment 47 prevent sliding tube 46 from rotating while still permitting relative movement between the sliding tube latched to the rod 10 and the inner tube 40 fixed to the flange 42.

Referring in conjunction to FIGS. 2 and 3, rod latch 34 is operated by rod latch motor 64, driving internally splined first rod latch tube 66, which is next inside drive tube 48, via shaft 65 and meshing spur gears 68 and 70 and second tube segment 72. Second tube segment 72 is fixed to both spur gear 70 and first rod latch tube 66. Spur gear 68 is fixed to the rod latch motor shaft 65. FIG. 5 clearly shows the concentric relationship of drive tube 48 and first rod latch tube 66. First rod latch tube 66 has splined engagement with externally splined second rod latch tube 74 by a short segment of external splines 76 at one end of second rod latch tube 74. Second rod latch tube 74 has an externally threaded portion 75 a distance from its splines 76. The threaded portion 76 on second rod latch tube 74 has threaded engagement with flanged tube 67 which is integral with flange 79 which is, in turn, attached to sliding tube 46. FIG. 5 shows the concentric relationship of tubes 66, 74, and 67. Therefore, drive fairing tube 39, sliding tube 46, and flanged tube 67 telescope together into and out of drive 12. Rotation of first rod latch tube 66 rotates second rod latch tube 74; rotation of second rod latch tube 74 causes second rod latch tube 74 to simultaneously move along the longitudinal axis of drive 12 since second rod latch tube 74 has threaded engagement with flanged tube 67 which cannot move with respect to rod latch 34. Second rod latch tube 74 also has threaded engagement with a second stack latch tube 77, which is stationary while second rod latch tube 74 is moving. The splined engagement between first and second rod latch tubes 66 and 74 permits linear movement of second rod latch tube 74 regardless of the position of the rod 10 with respect to the drive 12.

When the rod 10 is moved by drive 12, drive fairing tube 39, sliding tube 46, flanged tube 67, second rod latch tube 74, and second stack latch tube 77 move with rod 10 and outer tube 38, inner tube 40, drive tube 48, first rod latch tube 66, and a first stack latch tube 94 all remain stationary.

Turning exclusively to FIG. 3, second rod latch tube 74 terminates in a ball 82 anchored to the tube; the ball has a hole in it coaxial with the tube 74. The ball 82 rides against at least one elongated dog 84 which is mounted on and rotatable about a pin 90 anchored to sliding tube 46. The pin 90 is oriented so that its long axis is at a right angle to the longitudinal axis of drive 12. The ball 82 can be moved along the longitudinal axis of the drive 12 in a path ending near flange 79 where the ball is shown in phantom. The dog 84 has a concave inside surface 85 which is in sliding contact with the ball 82. The surface 85 is curved to the radius of the ball 82 at a right angle to the long axis of the dog 84; this keeps the dog centered on the pin 90 with respect to the ball. A portion of the inside surface 85 between the pin 90 and the flange 79 makes an oblique angle with the remainder of surface 85; it also makes an oblique angle with respect to the longitudinal axis of the control rod drive 12, and is long enough so that the obliquely angled portion extends into the path of the ball 82. When the ball 82 is moved along its path, it will push the oblique portion out of its path, thus rotating the dog 84. When the ball 82 has reached the limit of its path, pushing the oblique portion of surface 85 out of its path, the remainder of surface 85 will now extend into the path of ball 82; when the ball is moved the opposite way, it will rotate the dog 84 counterclockwise. The opposite end of the dog 84 is an ear 86 which engages a rod latch support surface 80 on a flange 88 on the rod 10 when the rod latch 34 is in the latched position, as shown in FIG. 3. Support flange 88 is attached to one end of rod structural tube 89, which is the principal structural member of rod 10. Rod fairing tube 91 provides a smooth cover for the rod 10. A plurality of rods 109 containing neutron-absorbing material are mounted in hubs 101 attached to the inside of structural tube 89. When the rod latch motor 64 is operated to move the ball 82 toward the gear case 20, the ball 82 disengages ear 86 from support flange 88. Ball 82 is shown in phantom at the other end of its travel. The drive motor 50 may now be operated to move the drive 12 away from the rod 10 since rod latch mechanism 34 is now in the unlatched position. By reversing the described steps, latch mechanism 34 may be returned to the latched position.

The stack latch mechanism 36, attached to the other end of rod structural tube 89, is operated in a similar fashion. Referring simultaneously to FIGS. 2, 3 and 4, shaft 92 is manually rotated by a wrench (not shown). Shaft 92 is fixed to the externally splined first stack latch tube 94 which has splined engagement with a short internally splined segment 95 on the second stack latch tube 77. The second stack latch tube 77 has threaded engagement with surrounding second rod latch tube 74. Since second rod latch tube 74 is stationary while the stack latch is being operated, rotation of second stack latch tube 77 by means of first stack latch tube 94 will cause second stack latch tube 77 to rotate and therefore move linearly along the longitudinal axis of drive 12. Second stack latch tube 77 is connected to a smaller diameter third stack latch tube 96 to provide clearance between the tube 96 and the ball 82 on second rod latch tube 74 through which tube 96 passes. Third stack latch tube 96 abuts notch piece 113, which is mounted on one end of fourth stack latch tube 99; tube 99 continues as shown in FIG. 4 to stack latch mechanism 36 where it terminates in another ball 98 similar to ball 82. Fourth stack latch tube 99 is slidingly supported by hubs 101 and 105, which are attached to rod structural tube 89. Spring 97, concentric with fourth stack latch tube 99, urges the tube 99 toward the gear case 20, thereby maintaining contact between notch piece 113 and third stack latch tube 97 as long as the drive 12 is latched to the rod 10. Ball 98 actuates a dog 100, similar in shape to dog 84, in the same way ball 82 actuates dog 84. This brings the stack latch 36 to the unlatched position. Ball 98 and dog 100 are shown in phantom in the unlatched position. Reversing the steps moves the stack latch 36 to the latched position. When the stack latch mechanism 36 is in the engaged position, ear 103 on dog 100 supports the bottom surface of the stack 24 so that the stack 24 may be raised above the core 14 by operating the drive 12 to pull the control rod 10 and stack 24 out of the core.

When the stack 24 has been moved to the plenum 32, a fuel-handling machine (not shown) assumes the weight of the rod 10 and stack 24 by resting against fuel-handling machine support surface 106 of support flange 88, shown in FIG. 3. At that point, the rod latch 34 may be unlatched and the drive 12 moved away from the rod 10 so that the fuel-handling machine can move the rod 10 and the stack 24 which the rod is still supporting.

An interlock tube 108 extends from ball 82 along the longitudinal axis of third stack latch tube 96 past a spring-loaded detent 110, which slides in a detent tube 112 attached at a right angle to the inside surface of rod structural tube 89. When the rod latch 34 is disengaged, the detent 110 is urged into the notch piece 113 of tube 99, thus preventing the stack latch mechanism 36 from being unlatched while the rod latch mechanism 34 is unlatched. If the stack latch mechanism 36 is already in the unlatched position, this interlock is inoperative because the notch piece 113 has moved beyond the detent 112 which will then slide on the smooth surface of the fourth stack latch tube 99 until the stack latch mechanism 36 is relatched. Detent 110 has a surface 115 at an oblique angle with third rod stack latch tube 96 so that tube 108 can drive the detent back into the detent tube 112 whether the stack latch mechanism 36 is latched or unlatched.

The embodiments of the invention in which an exclusive property or privilege is claimed are defined as follows:

1. A control rod system for handling a stack of fuel blocks in a nuclear reactor core, comprising:
    a control rod;
    stack latch means attached to one end of the control rod for supporting a stack of fuel blocks;
    a control rod drive for driving the control rod into or out of a hole in the stack of fuel blocks;
    rod latch means attached to one end of the control rod for connecting the control rod drive to the control rod;
    interlock means having biased detent means attached to the control rod, and means on the stack latch means for engagement with the detent means when the rod latch means is unlatched while the stack latch means is latched wherein the stack latch means cannot be unlatched while the rod latch means is being unlatched.

2. The control rod system of claim 1, wherein the control rod comprises:
    a structural tube;
    a support flange attached to one end of the structural tube and having a rod latch surface, supportable by the rod latch means, inside the circumference of the structural tube, the plane of the surface being perpendicular to the longitudinal axis of the control rod, and a fuel-handling machine support surface, supportable by a fuel-handling machine, outside the circumference of the structural tube, the plane of the surface being perpendicular to the longitudinal axis of the control rod;
    a plurality of rods containing neutron-absorbing material attached to hubs mounted within the structural tube.

3. The control rod system of claim 1, wherein the rod latch means comprises:
    a rotatable first rod latch tube mounted inside and concentric with a drive tube;
    a rotatable second rod latch tube inside the first rod latch tube and having splined engagement therewith whereby rotation of the first rod latch tube is transmitted to the second rod latch tube, the second rod latch tube also being moveable along the longitudinal axis of the control rod drive;
    a flanged tube fixed to a sliding tube concentric with and between the first and second rod latch tubes, having threaded engagement with the second rod latch tube whereby the second rod latch tube moves along the longitudinal axis of the control rod drive when it is rotated by the first rod latch tube;
    a ball fixed to an end of the second rod latch tube and moveable therewith on a path coaxial with the longitudinal axis of the control rod drive and having a hole therein coaxial with the longitudinal axis of the control rod drive;
    a dog, elongated along the longitudinal axis of the control rod drive, and rotatably mounted on a pin fixed inside the sliding structural tube at a right angle to the longitudinal axis and further having an inside surface in sliding contact with the ball wherein a portion of the surface at an oblique angle to the remainder of the inside surface and at one end extends into the path of the ball, an ear at the opposite end extending outside the circumference of the control rod in a supporting relationship with the fuel stack to be lifted whereby
    when the first and second rod latch tubes are operated to move the ball toward the control rod drive, the ball will slide against the portion of the inside surface of the dog extending into its path, rotating the dog about the pin and unlatching the dog from the fuel stack, thus disconnecting the control rod drive from the control rod.

4. The control rod system of claim 1, wherein the stack latch means comprises:
    a rotatable first stack latch tube mounted concentric with the drive tube and inside the drive tube;
    a rotatable second stack latch tube surrounding and having splined engagement with the first stack latch tube, the second stack latch tube further having threaded engagement with the surrounding second rod latch tube whereby rotation of the first stack latch tube rotates the second stack latch tube which simultaneously moves along the longitudinal axis of the control rod drive due to the threaded engagement with the second rod latch tube which is stationary;

a moveable third rod latch tube, of smaller diameter than the second rod latch tube and extending from an end thereof and passing through the ball and extending beyond the end of the control rod drive inside a plenum;

a fourth stack latch tube mounted slidably in the control rod and having an end which is urged against the end of the third stack latch tube by a spring;

a ball attached to the opposite end of the fourth stack latch tube; and moveable therewith on a path coaxial with the longitudinal axis of the control rod;

a dog, elongated along the longitudinal axis of the control rod, and rotatably mounted on a pin fixed inside the rod structural tube at a right angle to the longitudinal axis, and further having an inside surface in sliding contact with the ball wherein a portion of the surface at an oblique angle to the remainder of the inside surface and at one end extends into the path of the ball, an ear at the opposite end extending outside the circumference of the control rod in a supporting relationship with the stack of fuel blocks whereby when the stack latch tubes are operated to move the ball toward the control rod drive, the ball will slide against the portion of the inside surface of the dog extending into its path, rotating the dog about the pin and unlatching the dog from the fuel stack, thus disconnecting the control rod from the fuel stack.

5. A control rod drive system for handling stacks of fuel blocks in a gas-cooled nuclear reactor comprising:

a control rod drive fixed to a cover of a pressure vessel enclosing the nuclear reactor core, and having one end penetrating through the cover and terminating in a plenum above the core, an opposite end having a gear case with a rod drive motor, a rod latch drive motor, and a stack latch drive shaft connected thereto, the control rod drive further having stationary outer and inner tubes fixed to a flange of the gear case, a sliding tube concentric with and inside the inner tube and having splined engagement therewith, a drive fairing tube attached at one end to the sliding tube and sliding between the inner and outer tubes, a ball-screw nut fixed to the sliding tube, and a ball-threaded drive tube drivingly connected to the rod drive motor by the gear case and having ball-threaded engagement with the ball-screw nut, whereby rotation of the drive tube by the rod drive motor exerts a force along the longitudinal axis of the control rod drive on the ball-screw nut, causing the ball-screw nut, sliding tube, and fairing tube to telescope with respect to the control rod drive;

a rod latch mechanism for connecting the control rod drive to the control rod having a first rod latch tube mounted concentrically inside the drive tube and drivingly connected to a rod latch motor by the gear case, a second rod latch tube having splined engagement with the first rod latch tube and mounted concentrically inside the first rod latch tube, a flanged tube placed concentrically between the first and second rod latch tubes and mounted on a flange attached to the sliding tube of the control rod drive, and having threaded engagement with the second rod latch tube, a ball on an end of the second rod latch tube away from the gear case, the ball having a hole therein coaxial with the longitudinal axis of the control rod drive, and at least one elongated dog rotatably mounted in the sliding tube on a pin at a right angle to the longitudinal axis of the drive, the dog having an inside surface in sliding contact with the ball wherein a portion of the surface at an oblique angle to the remainder of the inside surface and at an end of the dog nearer the gear case extends into the path of movement of the ball which supports the rod support surface of the support flange of the control rod, whereby when the rod latch motor is operated to move the ball along the longitudinal axis of the drive the ball will slide against the oblique portion of the inside surface of the dog, rotating the dog about the pin and disengaging the ear from the control rod so that the rod latch mechanism is now unlatched from the control rod;

a control rod having a structural tube, a support flange attached to an end of the structural tube and having a rod latch support surface wherein the surface is inside the circumference of the structural tube and the plane of the surface is at a right angle to the longitudinal axis of the control rod and a fuel-handling machine support surface outside the circumference of the structural tube wherein the plane of the support surface is also at a right angle to the longitudinal axis, a fairing tube surrounding the structural tube, and a plurality of rods containing neutron-absorbing material which are mounted in hubs attached to the inside of the rod structural tube;

a stack latch mechanism for supporting a stack of fuel blocks having a first stack latch tube mounted concentrically inside the second rod latch tube and drivingly connected to a shaft by the gear case and having splined engagement with a second stack latch tube surrounding the first stack latch tube, the second stack latch tube being mounted concentrically inside the second rod latch tube and having threaded engagement therewith, a third stack latch tube of smaller diameter than the second stack latch tube and proceeding from an end thereof and passing through the hole in the ball on the second rod latch tube and terminating a distance beyond the end of the control rod drive inside the plenum and abutting a fourth stack latch tube which is slidably mounted in the neutron absorber rod hubs in the control rod and urged into contact with the third stack latch tube when the rod and drive are latched together by a stack latch spring concentric with the fourth stack latch tube, a ball on an end of the fourth stack latch tube away from the control rod drive which slides on an inside surface of at least one elongated dog rotatably mounted on a pin attached inside the rod structural tube at a right angle to the longitudinal axis of the control rod, the dog having an inside surface in sliding contact with the ball wherein a portion of the surface at an oblique angle to the remainder of the inside surface and at an end of the dog nearer the control rod drive projects into a path of movement of the ball along the longitudinal axis of the control rod and having an ear at the opposite end of the dog which makes supporting contact with the bottom of the stack of fuel blocks whereby when the shaft is operated the fourth stack latch tube is moved along the longitudinal axis of the control rod the ball will slide against the oblique portion of the inside surface of the dog rotating the dog about the pin and unlatching the stack latch mechanism from the fuel stack;

an interlock to prevent unlatching of the stack latch mechanism while the rod latch mechanism is being unlatched having an interlock tube extending from the ball on the end of the second rod latch tube a distance into the control rod and covering a notch in the fourth stack latch tube, and a spring-loaded detent sliding in a detent tube attached at a right angle to the inside surface of the rod structural tube opposite the notch in the fourth stack latch tube when the stack latch mechanism is in the engaged position, whereby when the rod latch mechanism is disengaged drawing the interlock tube toward the gear case to uncover the notch the detent is urged by the spring into the notch in the fourth stack latch tube preventing the fourth stack latch tube from being moved by the stack latch spring when the rod drive is retracted and the third stack latch tube no longer abuts the fourth stack latch tube, the detent further having a surface at an oblique angle to the end of the interlock tube covering the notch so that the interlock tube pushes the detent out of the notch when the control rod drive is latched to the control rod.

* * * * *